United States Patent [19]

Plummer

[11] Patent Number: 5,028,110
[45] Date of Patent: Jul. 2, 1991

[54] FIBER OPTICAL COMPONENT

[75] Inventor: William T. Plummer, Concord, Mass.

[73] Assignee: ADC Telecommunications, Inc., Minneapolis, Minn.

[21] Appl. No.: 708,559

[22] Filed: Mar. 6, 1985

Related U.S. Application Data

[63] Continuation of Ser. No. 444,876, Nov. 29, 1982, abandoned.

[51] Int. Cl.$^5$ .............................. G02B 6/26; G02B 6/42
[52] U.S. Cl. ................................ 350/96.15; 350/96.18; 350/96.20
[58] Field of Search ...................... 250/227; 350/96.15, 350/96.16, 96.18, 96.20, 96.21; 357/30

[56] References Cited

U.S. PATENT DOCUMENTS

| | | | |
|---|---|---|---|
| 4,280,751 | 7/1981 | DiVita | 350/96.15 |
| 4,329,017 | 5/1982 | Kapany et al. | 350/96.15 |
| 4,422,714 | 12/1983 | Benoit et al. | 350/96.15 |
| 4,450,461 | 5/1984 | Cook et al. | 357/19 |

Primary Examiner—Frank Gonzalez
Attorney, Agent, or Firm—Merchant & Gould

[57] ABSTRACT

An optical component for bidirectionally coupling an optical fiber with active devices for transmitting and receiving information in the form of electromagnetic radiation. The component comprises an integrally formed body molded of optical quality plastic and having two opposed ends, one of which is adapted to receive an optical fiber and the other the active devices. Between the two ends are symmetrically arranged ellipsoidal and planar reflecting surfaces which define a pair of double folded optical paths, one each from an active device to the optical fiber. The reflecting surfaces operate by total internal reflection and are arranged along with other body surfaces so that the component can be molded without the need for mold side action.

16 Claims, 2 Drawing Sheets

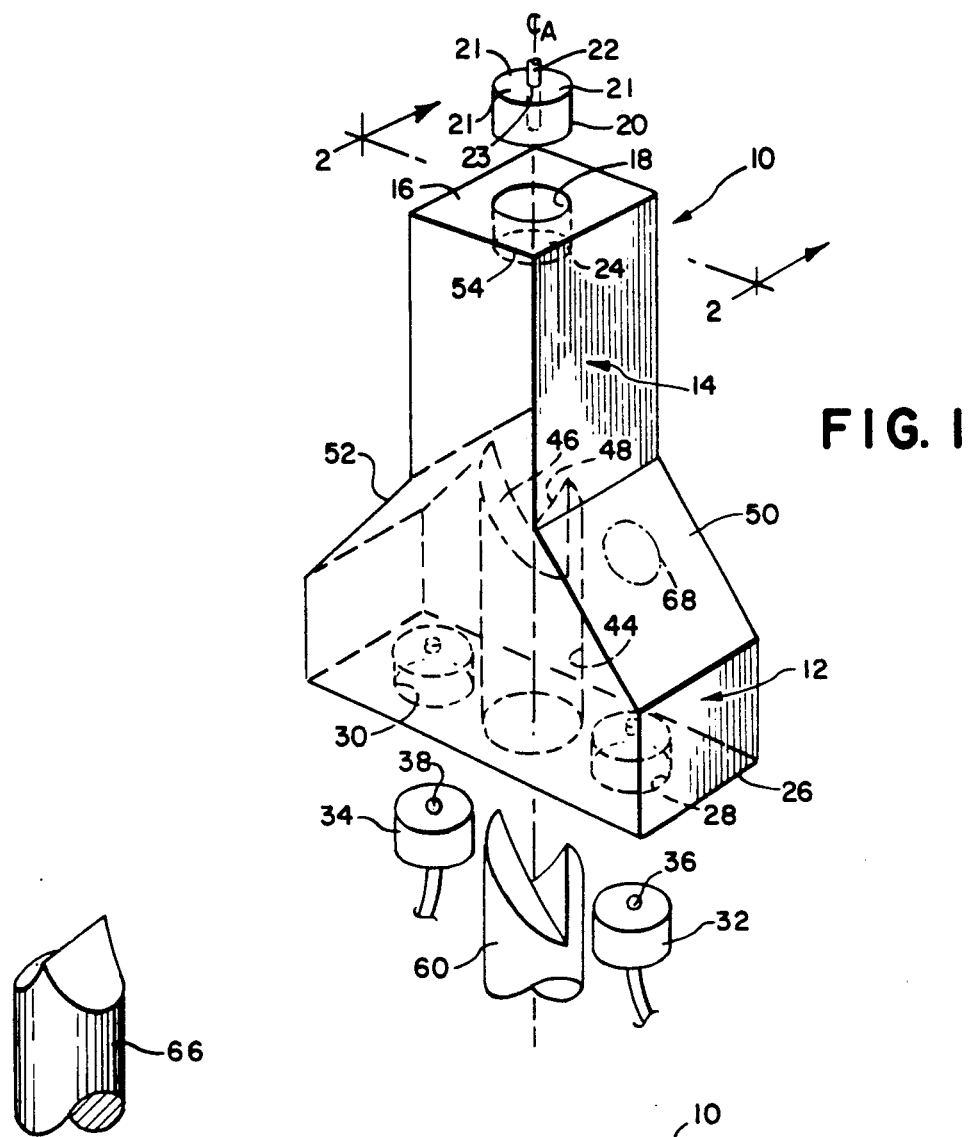
FIG. 1
FIG. 4
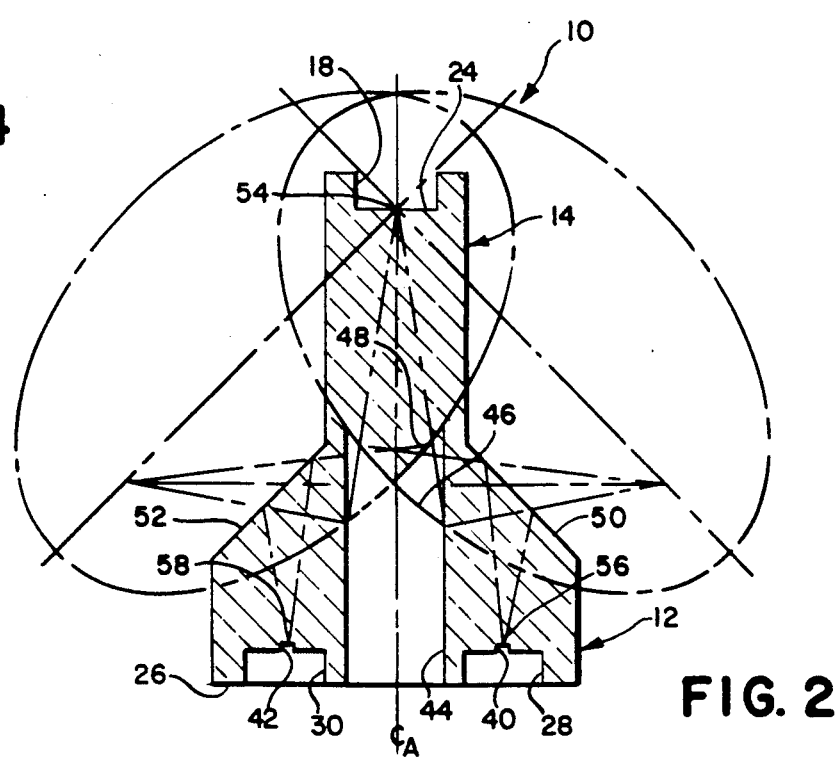
FIG. 2

FIBER OPTICAL COMPONENT

This is a continuation of application Ser. No. 444,876 filed Nov. 29, 1982 (now abandoned).

BACKGROUND OF THE INVENTION

This invention in general relates to fiber optic communication links and in particular to an optical component for coupling an optical fiber with active devices for transmitting and receiving information in the form of electromagnetic radiation.

As is well know, fiber optic communication links have the same basic elements found in electrical communication systems. In the basic link, a transmitter operates to convert electrical signals into light signals which then travel through optical fibers to a receiver where the light signals are converted back to electrical forms. In the fiber optic link, connectors serve to assure that tight physical and optical contact is made and maintained between optical fibers and the transmitting or receiving components of the system.

Although seemingly simple, making the connection between the components of a fiber optic communications link is extremely troublesome and very different from making an electrical connection which requires only a reliable physical contact between two conductors. In contrast, the fiber optic link connection requires precise angular alignment between components which can be very small as, for example, a fiber core of 50 microns in diameter. Angular alignment within certain tolerances is important to assure that sufficient light can enter and leave the components. If the angular tolerance is not satisfied, leakage occurs causing large signal losses which make an otherwise attractive communications link impractical.

To solve the problem of connection with tolerable losses, those skilled in the art have provided solutions which are either strictly mechanical in nature or which involve some combination of mechanical alignment and optical action utilizing either refractive or reflective surfaces or both.

However, both types of connectors are relatively expensive because they must be precisely fabricated to exacting standards. Added to this requirement that a connector be bidirectional, i.e., one in which a fiber connects with more than one device or other optical fiber, obviously increases the price for such connectors.

It is therefore a primary object of the present invention to provide a fiber optic bidirectional connector that is structured for ease of fabrication.

It is another object of the present invention to provide a relatively inexpensive fiber optic connector.

Other objects of the invention will in part be obvious and will in part appear hereinafter. The invention, accordingly, comprises the apparatus possessing the construction, combination of elements, and arrangement of parts which are exemplified in the following detailed disclosure.

SUMMARY OF THE INVENTION

This invention in general relates to fiber optic communication links and in particular to an optical component for bidirectionally coupling an optical fiber with active devices for transmitting and receiving information in the form of electromagnetic radiation.

The optical component of the invention comprises a body that is integrally molded of an optical plastic and includes a plurality of recesses for facilitating receiving and positioning an optical fiber or active devices to either introduce radiation into the body or to receive radiation via the body. Within the body are included totally internally reflecting surfaces that are structured and arranged to define optical paths between the recesses by which radiation from a transmitting device is directed, after entering the body, into the end of an optical fiber located in its recess and radiation introduced into the body via the end of an optical fiber is directed into a receiving device located in its recess. All of the recesses and the totally internally reflecting surfaces are arranged for fabrication by mold surfaces which move exclusively in directions parallel to one another during the molding process.

The totally internally reflecting surfaces preferably are ellipsoidal and planar surfaces arranged so that the optical paths between a fiber and the active devices are folded.

DESCRIPTION OF THE DRAWINGS

The novel features that are considered characteristic of the invention are set forth with particularity in the appended claims. The invention itself, however, both as to its organization and method of operation together with other objects and advantages thereof will be best understood from the following description of the illustrated embodiments when read in connection with the accompanying drawings wherein like numbers have been employed in the different figures to denote the same parts and wherein:

FIG. 1 is an enlarged perpective view of the connector of the invention shown in combination with other components of a fiber optic communications link and a mold segment;

FIG. 2 is a cross-sectional view of the connector of FIG. 1 taken generally along line 2—2 in FIG. 1;

FIG. 4 is an enlarged perspective view of a mold segment for forming part of the embodiment of FIG. 3.

DETAILED DESCRIPTION OF THE PREFERRED EMBODIMENT

Figure 3:
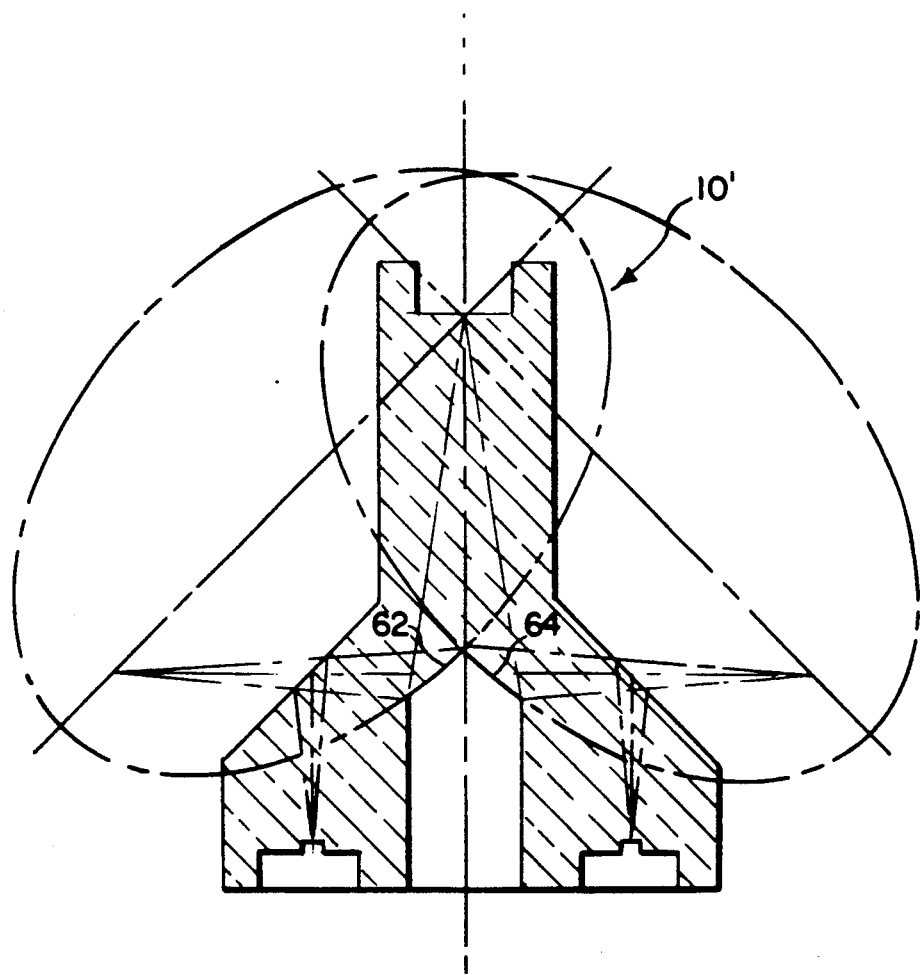
FIG. 3 is a cross-sectional elevation of an alternate embodiment of the invention.

The present invention relates to an optical component for bidirectionally coupling an optical fiber with active devices for transmitting and receiving information in the form of electromagnetic radiation and, as such, is particularly suitable for use as a connector in fiber optic communications links.

The optical component of the invention, which is generally designated at 10 in FIGS. 1 and 2, is an integrally formed piece preferably fabricated of a suitable optical plastic material using well-known precision injection molding techniques.

As illustrated in FIGS. 1 and 2, the component 10 comprises a solid plastic body of constant depth which includes a base section 12 having a vertical section in the shape of a pentagon and a rectangularly shaped upper section 14 vertically depending from the base section 12.

The upper section 14 includes a top upwardly facing surface 16 that is preferably perpendicular to a longitudinal axis, CA, extending through the center of the component 10. In the top surface 16 there is a cylindrical recess or bore 18 that is concentric with the component central axis, CA, and is dimensioned to receive and position therein an optical fiber assembly comprising a resilient sleeve 20 formed of three triangular shaped pads (21) which collectively define between their apical edges a hole 23 into which an optical fiber 22 inserts. The inside diameter of the recess 18 and the outside diameter of the sleeve 20 are selected to create a mechanical interference between them, and the hole 23 formed for the optical fiber 22 is also undersized with respect to the optical fiber diameter so that the assembly, when inserted into the recess 18, automatically positions the end of the optical fiber 22 on the component central axis, CA, and butted against the bottom wall (24) of the recess 18. Preferably, an index matching fluid is used at the interface of the optical fiber end and the recess bottom wall 24 to reduce reflection losses.

The cylindrical recess 18 may have shapes other than that illustrated where a particular fiber assembly other than that described requires a different geometry for proper interfacing. The only restriction on the shape of the recess 18 is that it should be capable of being formed by mold parts, particularly inserts, that can move in directions which are exclusively parallel to the longitudinal axis, CA, during an injection molding process.

The bottom surface 26 of the base 12 includes two spaced apart recesses, 28 and 30, that are cylindrically shaped and adapted to receive active devices such as a transmitter or emitter 32 and a photosensitive receiver 34 both of which are illustrated diagrammatically but are of a well-known type such as those, for example, hermetically sealed in cans having ball lenses such as those at 36 and 38, respectively, centered over either light emitting or receiving areas to enhance optical efficiency.

However, the recesses, 28 and 30, may also be otherwise shaped and, as before, are only restricted by the requirement that they can be molded with mold inserts that move parallel to the longitudinal central axis, CA.

In the base of each of the recesses, 28 and 30, there are small relief holes 40 and 42, respectively, that are dimensioned to receive therein the ball lenses, 36 and 38, of the transmitter 32 and the receiver 34. At the interface of the ball lenses, 36 and 38, with the relief holes, 40 and 42, an index matching fluid is provided to again reduce reflections.

A third recess 44 is formed in the base section 12, concentric with the longitudinal central axis, CA. The bottom of the recess 44 terminates in two crossed ellipsoidal surface segments 46 and 48. The ellipsoidal surface segment 46 faces a 45-degree plane surface 50 of the base section 12, and the ellipsoidal surface segment 48 faces another 45-degree sloped plane surface 52 of the base section 12.

The index of refraction of the material comprising the optical component 10, the ellipsoidal surface segments, 46 and 48, and the planar surface segments, 50 and 52, are all selected in a well-known manner so that the surfaces 46, 48, 50, and 52 totally internally reflect light within the body proper of the optical component 10 over predetermined angular ranges and behave, therefore, as mirrored surfaces.

The end of the optical fiber 22 located at one foci (54) of the ellipsoidal surface segment 46 and the ball lens 36 of the transmitter 32 is at the other foci (56) of the ellipsoidal surface segment 48 as reflected off the plane surface 50. Consequently, light entering the body of the optical component 10 from the transmitter 32 first reflects off the plane surface 34 and then to the ellipsoidal surface segment 46 after which it is focused into the end of the optical fiber 22. In like fashion, the ball lens 38 of the receiver 34 is arranged at the foci (58) of the ellipsoidal surface segment 48 as refected from the plane surface 52 while again the optical fiber end is at the other foci of the ellipsoidal surface segment 48, that being the foci 54 which is common to both ellipsoidal surface segments, 46 and 48. Consequently, light emanating from the end of the optical fiber 22 is reflected off the ellipsoidal surface segment 48 after which it travels to the plane surface segment 52 and then into the ball lens 38 of the receiver 34.

This arrangement permits light from the transmitter 32 to enter the body of the component 10 via one folded optical path along which it travels to the end of the optical fiber 22, and light emerging from the optical fiber end 22, travels along another folded optical path where it then enters the receiver 34.

As will be appreciated by those skilled in the art, the ellipsoidal surface segments 46 and 48 can be formed with a mold part or insert, such as that partially shown at 60 in FIG. 1, which travels exclusively along the central longitudinal axis, CA, in the process of forming the opticial component 10. Therefore, all recesses and surfaces, including the plane surfaces 34 and 36, can be molded with a molding arrangement which requires only movement of mold inserts in directions parallel to one another thereby making the fabrication of the optical component 10 much easier than other arrangements which require mold site action as well. Such an arrangement reduces mold complexity and makes for easier control of critical surfaces requiring high precision particularly where the component to be molded is, as here, relatively small typically being on the order of 0.8 inch in overall length with the other dimensions approximately in the proportions shown.

Referring now to FIG. 2, it will be appreciated by those skilled in the optical arts that there is a certain amount of coma due to the different optical path lengths between the end of the optical fiber 22 and the edges of the ellipsoidal surface segments, 46 and 48. As a result of this, the image of the end of the optical fiber 22, if initially circular, when projected onto either the emitter ball lens 36 or the receiver ball lens 38 would be slightly vee shaped depending on the amount of comatic aberration present. However this is not a problem if the long dimension of such an vee-shaped image does not exceed the diameter of the ball lenses, 36 and 38, or if a certain amount of optical inefficiency can be tolerated. However, if it is required to reduce the amount of coma present, the arrangement of FIG. 3 can be used. In FIG. 3 an alternate embodiment for the optical component 10 is shown, and it is designated generally at 10'. The difference between the optical components 10 and 10' is that in the optical component 10' the length of the ellipsoidal surface segments, which are now designated at 62 and 64, has been reduced thereby reducing the difference in optical path length for extreme rays traveling from the end of the optical fiber 22 to either the emitter 32 or receiver 34. The surfaces, 62 and 64, are formed by a mold insert which is partially shown at 66 in FIG. 4. Except for their differences in ellipsoidal surfaces, the optical component 10 and 10' are otherwise identical. It is also preferred in either the optical component 10 or 10' to diffuse those parts of the plane surfaces 50 and 52 that are not to act as totally internally reflecting surfaces to reduce the possibility of cross talk between the active devices, 32 and 34, and the optical fiber 22. These areas to be diffused are defined diagrammatically on surface 50 in FIG. 1, for example, as all of that surface area on the plane surface outside of the intersection of any beam of illumination with the plane of the surfaces 50 and 52. Thus, in FIG. 1 the area which acts as a reflector is designated by the phantom oval 68 while the area outside of this oval on the plane surface 50 is preferably diffused. In a similar fashion, the plane surface 52 also would be diffused. Of course, this would only be necessary where one wanted to simultaneously transmit and receive along the optical fiber 22 but in practice transmission and reception would most likely occur at different times so that cross talk would not be a problem.

It will be obvious to those skilled in the art that other changes may be made in the above-described embodiments without departing from the scope of the invention. Therefore, it is intended that all matter contained in the above description or shown in the accompanying drawings shall be interpreted as illustrative and not in a limiting sense.

What is claimed is:

1. An optical component for coupling of optical devices for transmission of optical radiation therebetween, said component comprising a body integrally molded of optical material having a plurality of optical recesses disposed therein with each of at least a first and second of said recesses being adapted to facilitate receipt of an optical device for transmission or reception of optical radiation along first and second paths associated with each of said first and second recesses, respectively, and said body including a pair of reflective surfaces arranged to define a double folded optical path between said first and second paths for optically coupling said first and second recesses to each other; and said first and second recesses and said pair of reflecting surfaces are configured and arranged for fabrication by mold surfaces which move exclusively in parallel directions in the process of molding said body.

2. The component of claim 1 wherein at least one of said pair of reflecting surfaces is provided within a third recess formed in said body on a side thereof opposite said first recess, and said third recess being configured and arranged for fabrication by a mold surface moving exclusively in said parallel directions in the process of molding said body.

3. The component of claim 2 including a fourth recess adapted to facilitate receipt of an optical device for transmission or reception of optical radiation along a third path different from said first and second paths, said fourth recess being disposed on the same side of said body as said second recess and in spaced relation thereto, and said body including a second pair of reflecting surfaces arranged to define a double folded optical path between said first and third paths for optically coupling said first and fourth recesses to each other, one of said second pair of reflective surfaces being provided within said third recess adjoining said one reflecting surface of the first pair of reflecting surfaces, and all said recesses and said reflecting surfaces being configured and arranged for fabrication by mold surfaces which move exclusively in parallel directions in the process by molding the body.

4. An optical component for coupling of optical devices for transmission of optical radiation therebetween, said component comprising a body integrally molded of optical material having a plurality of optical recesses disposed therein with each of at least a first and second of said recesses being adapted to facilitate receipt of an optical device for transmission or reception of optical radiation along first and second recesses, respectively, and said body including a pair of reflective surfaces arranged to define a double folded optical path between said first and second paths for optically coupling said first and second recesses to each other, the reflection of at least one of said surfaces is provided by total internal refection.

5. An optical component for bidirectionally coupling an optical fiber with active optical devices for transmitting and receiving information in the form of electromagnetic radiation, said component comprising a body integrally molded of optical plastic and having first and second opposed sides with a central axis extending through said body from said first to said second side, said first side including at least one recess aligned with said central axis and adapted to facilitate receipt of an optical fiber or an active device and said second side having formed therein a plurality of recesses, one of which is aligned with said central axis and terminates in a first pair of surfaces which face said one recess in said first side, said body further including a second pair of surfaces, one each of which respectively faces a corresponding one of said first pair of surfaces, all of said body surfaces being located intermediate said first and second sides and operating by total internal reflection to define a pair of double folded optical paths each one of which has a common end aligned with said central axis and another end which is offset with respect to said central axis, all of said body recesses and reflecting surfaces being configured and arranged with respect to one another for fabrication by mold surfaces which move exclusively in directions parallel to said central axis in the process of molding said body.

6. An optical component for bidirectionally coupling an optical fiber with active devices for transmitting and receiving information in the form of electromagnetic radiation, said component comprising a body integrally molded of an optical plastic, said body having a first side including a recess for facilitating the receipt and positioning of an optical fiber therein to either introduce radiation into said body or receive radiation via said body along a central axis therethrough, said body having another side, opposite said first side, including therein a pair of spaced apart recesses, each along an axis offset with respect to said central axis and adapted for facilitating receiving and positioning therein an active device to either introduce radiation into or receive radiation via said body along a corresponding one of said offset axes, said body further including reflecting surfaces which are located between said sides thereof, operate by total internal reflection and define double folded optical paths between said recess in said first side and said pair of recesses in said other side so that radiation introduced into said body via a fiber or an active device initially travels generally parallel to said body central axis, is bent twice in traversing one of said folded optical paths, and thereafter travels generally parallel to said body central axis again.

7. The optical component of claim 6 wherein said reflecting surfaces include ellipsoidal and planar surfaces.

8. The optical component of claim 6 wherein each of said optical paths between a fiber and an active device is folded.

9. The optical component of claim 8 wherein said reflecting surfaces defining each of said optical paths comprises an ellipsoidal surface segment and a plane surface.

10. An optical component for bidirectionally coupling an optical fiber with active devices for transmitting or receiving information in the form of electromagnetic radiation, said component comprising a body integrally formed of an optical plastic with external end surfaces oppositely spaced from one another and provided with recesses adapted to facilitate the receipt and positioning of an optical fiber in one of said end surfaces and active devices in the other of said end surfaces to either introduce radiation into said body or receive radiation via said body, said body including reflecting surfaces, which operate by total internal reflection, for receiving radiation from either a fiber or an active device in one of said end surfaces and directing said received radiation towards the opposite end surface along a twice folded optical path located in said body between said end surfaces, said reflecting surfaces, said recesses, and said end surfaces all being configured and arranged with respect to one another for fabrication by mold surfaces which move exclusively in directions parallel to one another in the process of molding said body.

11. The optical component of claim 10 wherein said reflecting surfaces include ellipsoidal and planar surfaces.

12. An optical component for bidirectionally coupling an optical fiber with active devices for transmitting and receiving information in the form of electromagnetic radiation, said component comprising a body integrally molded of an optical plastic and having an axis extending therethrough, said body having one end formed with a recess aligned with said axis and structured for facilitating receiving and positioning an optical fiber with its end facing into said body and its longitudinal axis concentric with said body axis so that radiation introduced into said body by the fiber or received by the fiber via said body travels along said body axis, said body having another end, opposite said one end, and formed with a pair of spaced apart recesses structured to facilitate receiving and positioning the active devices to generally face the optical fiber end so that radiation either being received or transmitted by one or the other of the devices travels along paths which are offset, but generally parallel with said body axis, said body further including reflecting surfaces which operate by total internal reflection to define double folded optical paths between the optical fiber end and each of the active devices so that radiation introduced by the transmitting device travels along one of said double folded optical paths and thereafter along said body axis to enter the optical fiber end and so that radiation introduced into said body by the optical fiber end travels first along said body axis and thereafter along said other folded optical path so that it enters the receiving device, said recesses and said reflecting surfaces all being arranged so that they can be formed by mold surfaces which move exclusively in directions parallel to said body axis in the process of molding said body.

13. The optical component of claim 12 wherein said reflecting surfaces comprise ellipsoidal and planar surfaces.

14. The optical component of claim 13 wherein each of said folded optical paths comprises one planar surface and one ellipsoidal surface segment.

15. The optical component of claim 14 wherein said reflecting surfaces and said recesses are arranged so that the optical fiber end is located at one focus of both ellipsoidal surface segments while each active device is located at the image of the other focus of one of said ellipsoidal surface segments.

16. The optical component of claim 14 wherein both ellipsoidal surface segments are formed within a single recess in said body.

* * * * *